Dec. 25, 1934.  J. A. SUITER  1,985,808
GEAR SHIFT LEVER HORN BUTTON SYSTEM
Filed June 29, 1933
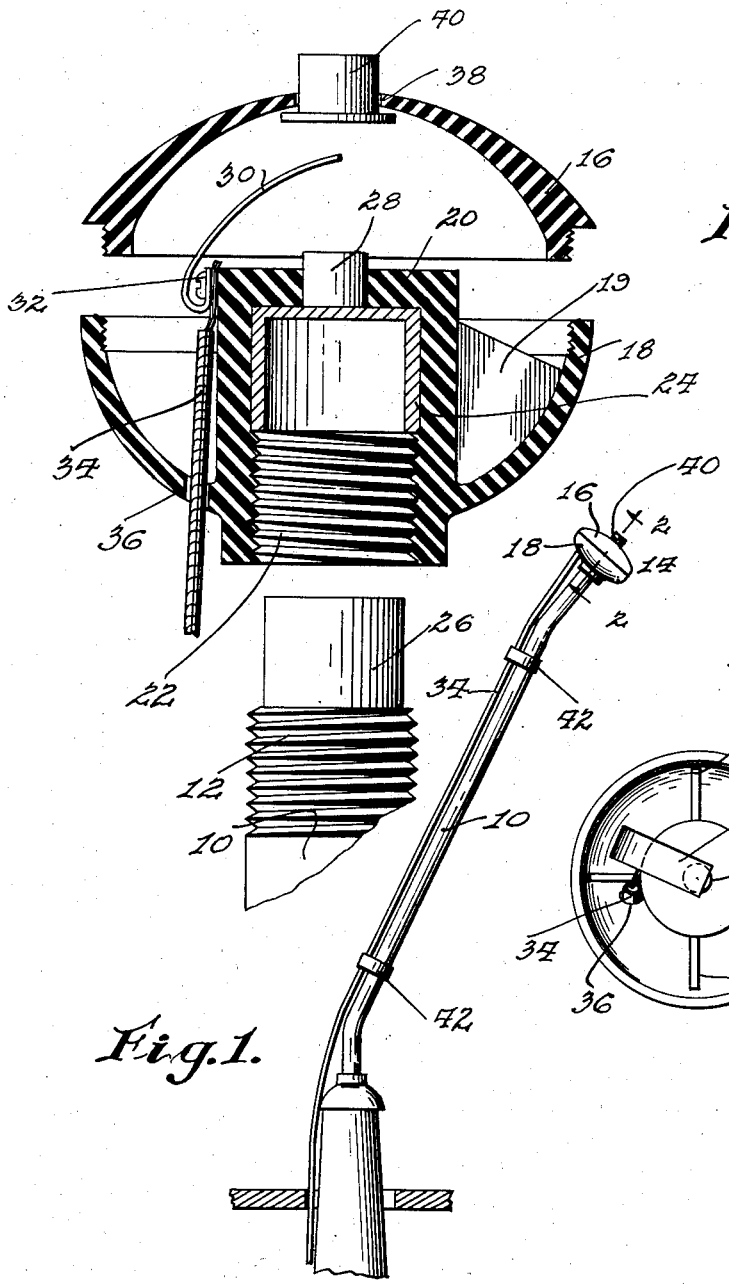
Inventor
Jay A. Suiter
By Robert Van Sickler
Attorney Patented Dec. 25, 1934

1,985,808

UNITED STATES PATENT OFFICE 1,985,808

GEAR SHIFT LEVER HORN BUTTON SYSTEM

Jay A. Suiter, Washington, D. C., assignor to Richard B. Griffin, Washington, D. C.

Application June 29, 1933, Serial No. 678,274

3 Claims. (Cl. 200—59)

My invention aims to provide, in general, an improvement in controls for electrical systems for motor vehicles, and is directed more particularly to circuit makers and breakers for a horn or other signal system.

One of the objects of my invention is to provide a switch which in combination with the gear shift lever of a motor vehicle, will greatly simplify the control of such a vehicle.

Another object is to provide a device of the kind described hereinafter which is very simple in construction and which is easily accessible for repair.

A still further object is to provide a device of the kind described which can readily be attached to a motor vehicle.

Other and further objects will become apparent in the following description and accompanying drawing.

In the drawing wherein one embodiment of my invention is disclosed for purposes of illustration, Fig. 1 is a side elevation of my invention on a motor vehicle gear shift lever;

Fig. 2 is an enlarged section taken on line 2—2 of Fig. 1; and

Fig. 3 is a plan view of the low portion of the circuit maker and breaker of my invention.

Referring more particularly to the embodiment shown in the drawing the gear shift lever 10 is of the conventional type with its upper end threaded as at 12 to receive the knob 14.

The knob 14 is preferably divided into two sections 16 and 18, as shown in Fig. 2 and is substantially hollow and is provided with strengthening webs 19. In the lower section of the knob is a socket member 20 which is internally threaded at 22 to accommodate the threaded end 12 of the lever 10.

A suitable contact member of good conducting material 24 is provided in the socket 20 and is preferably cup shaped to receive the end of lever 10. The extreme end of the lever 26 and the inner side of the cup 24 may be threaded or not, depending on the style of lever on the vehicle.

Rigidly and electrically connected to the member 24 is a pin 28 of copper or other good conductor which extends upward through and a short distance above the socket 20. This pin is adapted to cooperate with a spring metal contact member 30 secured on the side of the socket 20 as by a screw 32. A wire 34 runs from the screw, through an opening 36 in the lower half of the knob 18, to the ground connection of a horn or other annunciator.

The upper half of the knob 16 is provided with an opening 38 to receive a suitable push button 40 which is positioned directly over the spring contact 30 and pin 28.

In operation, current supplied from the battery of a vehicle is directed through the horn, which is grounded through the wire 34 contacts 28 and 30 and lever 10. When the button 40 is depressed, pushing the contact 30 into engagement with the pin 28, a ground connection is made through the cup 24 and lever 10, completing the circuit and operating the annunciator. The wire 34 is secured to the lever 10 as by clamps 42.

The device of my invention is extremely simple to install, since it can be applied to the gear shift lever of a motor vehicle without any alterations, and by making the knob hollow and in two parts, the contacts are readily reached for cleaning or repair.

In traffic my invention is extremely advantageous because the horn or other annunciator can be operated while shifting gears without removing the hand from the lever or the steering wheel. It also affords a convenient location within easy reaching distance at other times. It has the further advantage of being easier to repair than when placed on the steering wheel where the wires are run down the inside of the steering post.

Having illustrated and described a preferred embodiment of my invention what I claim and desire to secure by Letters Patent is:

1. A circuit controller comprising a conductive cylindrical cap engageable over the end of a gear shift lever, a contact integrally connected with said cap and projecting centrally therefrom, a substantially cylindrical casing member of insulating material enveloping said cap and being apertured for the projection of said contact therethrough, a spring member extending across said contact in normally spaced relation thereto and secured to one side of said casing member, a substantially semispherical insulated shell integrally connected with said casing member, said shell having its periphery disposed in a plane spaced away from the plane of the terminus of said casing member, a coacting shell connected with the aforesaid shell, a depressible button in said coacting shell aligned with said spring member and above said contact, a conductor forming one side of an electrical circuit connected with said spring member, said button operating to press said spring member into engagement with said contact for establishing a circuit through the said contact, cap and gear shift lever.

2. A circuit controller comprising a conductive cylindrical cap engageable over the end of a gear shift lever, a contact projecting centrally from said cap, a substantially cylindrical casing member of insulating material enveloping said cap and being apertured for the projection of said contact therethrough, a spring member extending across said contact in normally spaced relation thereto and secured to one side of said casing member, a substantially semispherical insulated shell having its periphery disposed in a plane spaced away from the terminus of said casing member, radially disposed web members interconnecting said cylindrical casing member and said semispherical insulated shell, a coacting shell connected at the periphery of the aforesaid shell, said coacting shell being centrally apertured and a depressible button extending through the aperture in said coacting shell and engaging said spring member above said contact, a conductor forming one side of an electrical circuit connected with said spring member, said button operating to press said spring member into engagement with said contact for establishing a circuit through the said contact, cap and gear shift lever.

3. A circuit controller comprising a cylindrical conductive cap engageable over the end of a gear shift lever, a substantially semispherical member of insulating material having a central cylindrical portion enveloping said conductive cylindrical cap and being internally screw threaded for engaging screw threads on the gear shift lever and retaining said cylindrical conductive cap in position, said central cylindrical portion of said semispherical member being apertured for the projection of a contact carried by said conductive cylindrical cap therethrough, a spring contact member supported by said central cylindrical portion of said semispherical member and projecting across the path of said contact in normally spaced relation thereto, a coacting semispherical member connected with the aforesaid semispherical member and apertured for the projection of a depressible button therethrough in alignment with said spring contact member, a conductor forming one side of an electrical circuit extending through the first mentioned semispherical member and connected with said spring member, said button operating to press said spring member into engagement with said contact, conductive cylindrical member and gear shift lever.

JAY A. SUITER.